United States Patent
Yamaguchi et al.

(10) Patent No.: US 10,704,226 B2
(45) Date of Patent: Jul. 7, 2020

(54) CONTROL METHOD IN MOTOR GRADER AND MOTOR GRADER

(71) Applicant: KOMATSU LTD., Minato-ku, Tokyo (JP)

(72) Inventors: Kota Yamaguchi, Tokyo (JP); Yasuko Yamamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 8 days.

(21) Appl. No.: 16/080,703

(22) PCT Filed: Mar. 16, 2017

(86) PCT No.: PCT/JP2017/010584
§ 371 (c)(1),
(2) Date: Aug. 29, 2018

(87) PCT Pub. No.: WO2017/164056
PCT Pub. Date: Sep. 28, 2017

(65) Prior Publication Data
US 2019/0063035 A1 Feb. 28, 2019

(30) Foreign Application Priority Data
Mar. 23, 2016 (JP) .................. 2016-058844

(51) Int. Cl.
*E02F 3/84* (2006.01)
*E02F 3/76* (2006.01)
(Continued)

(52) U.S. Cl.
CPC ................. *E02F 3/84* (2013.01); *B60G 1/02* (2013.01); *B60K 17/32* (2013.01); *E02F 3/76* (2013.01);
(Continued)

(58) Field of Classification Search
CPC .. E02F 3/84; E02F 3/76; E02F 3/7636; B60G 1/02; B60G 2400/05142; B60G 2300/09;
(Continued)

(56) References Cited

U.S. PATENT DOCUMENTS 1,839,755 A * 1/1932 Gledhill ................ E02F 3/7636
280/80.1
2,622,894 A * 12/1952 Keeler ................ B60G 21/007
280/86.757
(Continued)

FOREIGN PATENT DOCUMENTS

CN 201089948 Y 7/2008
CN 203846545 U 9/2014
(Continued)

*Primary Examiner* — Abigail A Risic
(74) *Attorney, Agent, or Firm* — Faegre Drinker Biddle & Reath LLP (57) ABSTRACT

A control method in a motor grader including a running wheel, an inclination mechanism which inclines the running wheel, an operation portion, and a sensor capable of detecting whether or not the running wheel is at an erect position includes outputting from a controller, a control signal for driving the inclination mechanism in response to an operation command in accordance with a state of operation onto the operation portion and stopping output of the control signal in response to the operation command when the sensor detects the erect position.

10 Claims, 7 Drawing Sheets

(51) Int. Cl.
  *B60K 17/32* (2006.01)
  *B60G 1/02* (2006.01)
(52) U.S. Cl.
  CPC ...... *E02F 3/7636* (2013.01); *B60G 2200/322* (2013.01); *B60G 2200/44* (2013.01); *B60G 2200/46* (2013.01); *B60G 2202/413* (2013.01); *B60G 2300/09* (2013.01); *B60G 2400/05142* (2013.01); *B60G 2500/40* (2013.01); *B60Y 2200/411* (2013.01)
(58) Field of Classification Search
  CPC ............... B60G 2500/40; B60K 17/32; B60Y 2200/411
  See application file for complete search history.

(56) References Cited

U.S. PATENT DOCUMENTS

| | | | | |
|---|---|---|---|---|
| 3,527,315 | A * | 9/1970 | Hampton | E02F 3/7636 180/238 |
| 3,783,966 | A * | 1/1974 | Campbell | B60K 17/30 180/433 |
| 7,673,883 | B2 * | 3/2010 | Damm | B60G 7/006 280/5.521 |
| 8,412,420 | B2 * | 4/2013 | Ruhter | E02F 3/7645 180/215 |
| 9,227,478 | B2 * | 1/2016 | Horstman | B60G 17/00 |
| 9,248,856 | B2 * | 2/2016 | Fujii | B62D 6/008 |
| 9,637,889 | B2 * | 5/2017 | Elkins | E02F 3/844 |
| 9,821,620 | B2 * | 11/2017 | Saeger | B60G 17/0162 |
| 10,076,939 | B2 * | 9/2018 | Simon | B62D 9/04 |
| 2006/0220335 | A1 * | 10/2006 | Damm | B60G 7/006 280/86.757 |
| 2008/0202111 | A1 * | 8/2008 | Harber | E02F 9/2232 60/422 |
| 2010/0114430 | A1 * | 5/2010 | Thomson | B62D 9/002 701/41 |
| 2012/0150390 | A1 | 6/2012 | Ruhter et al. | |
| 2015/0165856 | A1 * | 6/2015 | Horstman | B60G 17/00 280/6.154 |

FOREIGN PATENT DOCUMENTS

| | | |
|---|---|---|
| JP | S52-81825 A | 7/1977 |
| JP | H10-245825 A | 9/1998 |

* cited by examiner

LEFT LEANING OPERATION (B)

RIGHT LEANING OPERATION

CONTROL METHOD IN MOTOR GRADER AND MOTOR GRADER

TECHNICAL FIELD

The present invention relates to a control method in a motor grader and to a motor grader and particularly to a leaning operation in the motor grader.

BACKGROUND ART

A scheme for a motor grader for improving revolvability and straightness in travel by providing a leaning mechanism for inclining a front wheel from an erect position has conventionally been known.

In this connection, US Patent Application Publication No. 2012/150390 (PTD 1) has proposed a scheme for setting in advance a prescribed angle of inclination (which is also referred to as a lean angle) at which a front wheel is inclined from an erect position and adjusting the front wheel to the angle of inclination in accordance with an input operation.

CITATION LIST

Patent Document

PTD 1: US Patent Application Publication No. 2012/150390

SUMMARY OF INVENTION

Technical Problem

With the scheme, adjustment for setting an angle of inclination to a prescribed angle of inclination in response to an input operation different from a normal leaning operation is made. Since a manner of operation different from a normal leaning operation is required for adjustment of an angle of inclination, an operation becomes complicated.

The present invention was made in view of the above, and an object of the present invention is to provide a control method in a motor grader and a motor grader in which an angle of inclination of a finning wheel can be adjusted with a simplified operation.

Solution to Problem

A control method in a motor grader according to one aspect of the present invention, the motor grader including a running wheel, an inclination mechanism which inclines the running wheel, an operation portion, and a sensor capable of detecting whether or not the running wheel is at an erect position, includes outputting from a controller, a control signal for driving the inclination mechanism in response to an operation command in accordance with a state of operation onto the operation portion and stopping output of the control signal in response to the operation command when the sensor detects the erect position.

A motor grader according to one aspect of the present invention includes a running wheel, an inclination mechanism which inclines the running wheel, an operation portion, a sensor capable of detecting whether or not the running wheel is at an erect position, and a controller which controls the inclination mechanism. The controller outputs a control signal for driving the inclination mechanism in response to an operation command in accordance with a state of operation onto the operation portion and stops output of the control signal in response to the operation command when the sensor detects the erect position.

Advantageous Effects of Invention

According to the control method in a motor grader and the motor grader in the present invention, adjustment to a prescribed angle at which the running wheel is at an erect position can be made with a simplified scheme.

DESCRIPTION OF EMBODIMENTS

An embodiment will be described below with reference to the drawings. The same elements have the same reference characters allotted in the description below and their labels and functions are also the same. Therefore, detailed description thereof will not be repeated.

<A. Overall Construction>

Figure 1:
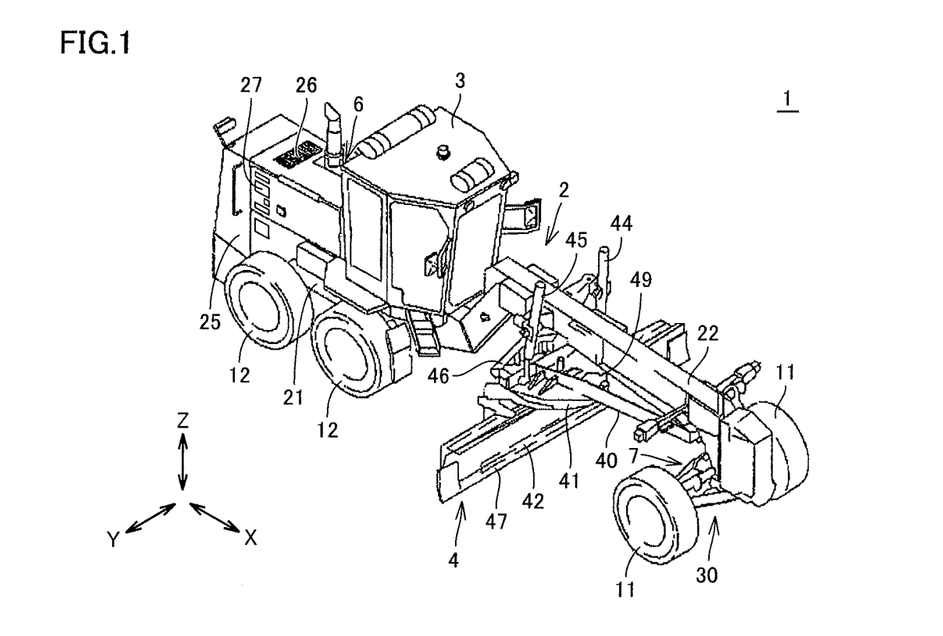
FIG. 1 is a perspective view schematically showing a construction of a motor grader 1 based on an embodiment of the present invention.

FIG. 1 is a perspective view schematically showing a construction of a motor grader 1 based on an embodiment of the present invention.

Figure 2:
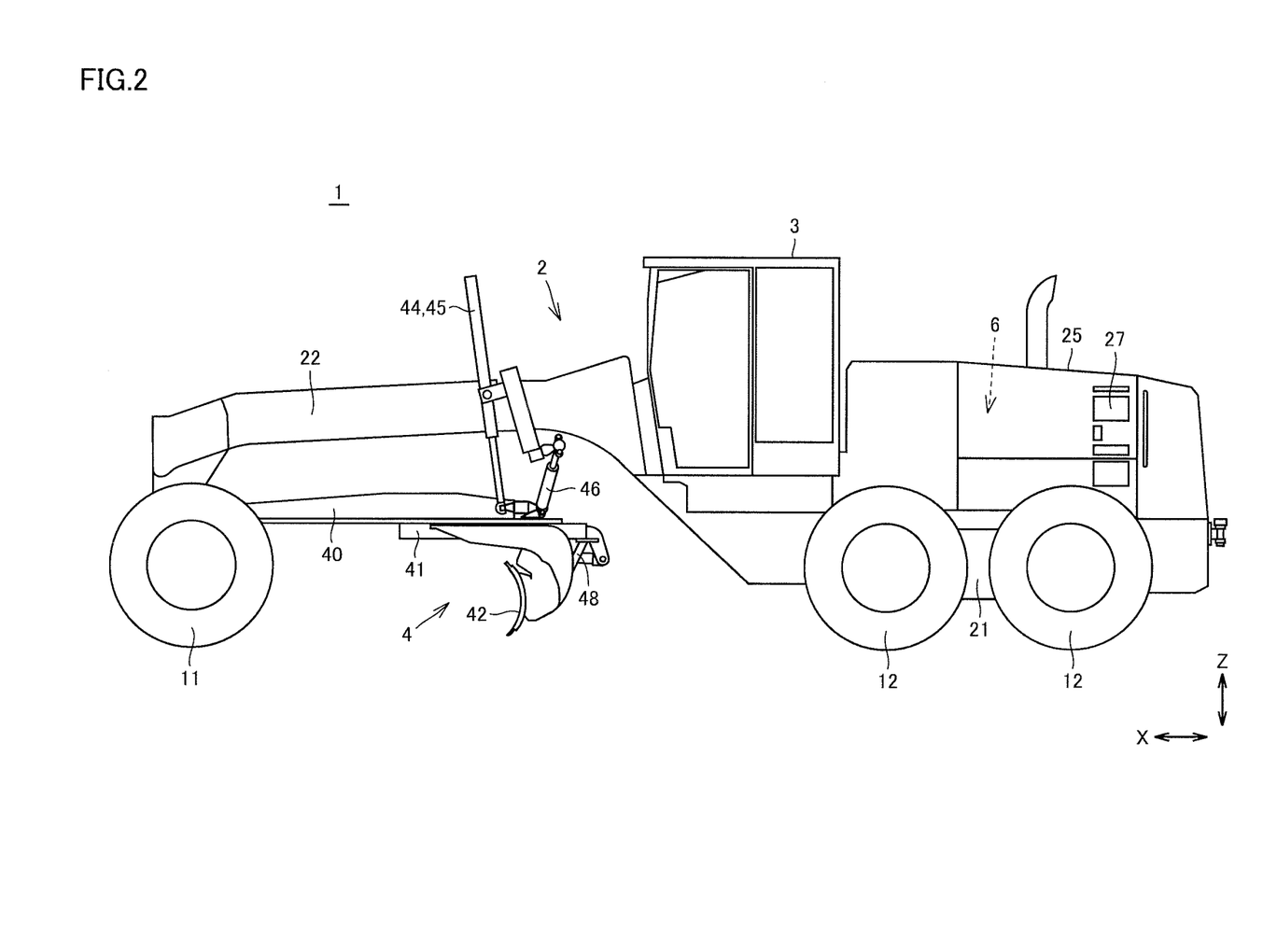
FIG. 2 is a side view schematically showing the construction of motor grader 1 based on the embodiment.

FIG. 2 is a side view schematically showing the construction of motor grader 1 based on the embodiment.

Referring to FIGS. 1 and 2, motor grader 1 based on one embodiment includes running wheels 11 and 12, a vehicular body frame 2, an operator's cab 3, a work implement 4, and a leaning mechanism (inclination mechanism) 30.

Motor grader 1 includes components such as an engine arranged in an engine compartment 6. Work implement 4 includes a blade 42.

Motor grader 1 can do such works as land-grading works, snow removal works, light cutting, and mixing of materials with blade 42.

Running wheels 11 and 12 include a front wheel 11 and a rear wheel 12. Though FIGS. 1 and 2 show running wheels consisting of two front wheels 11 one on each side and four rear wheels 12 two on each side, the number of front wheels and rear wheels and arrangement thereof are not limited as such.

Leaning mechanism 30 is attached to front wheels 11. Leaning mechanism 30 inclines front wheels 11 from an erect position with respect to the ground in a direction orthogonal to a direction of travel (a lateral direction). Specifically, revolvability of motor grader 1 can be improved by tilting front wheels 11 in the lateral direction.

In the description of the drawings below, a fore/aft direction means a fore/aft direction of motor grader 1. Namely, the fore/aft direction means a fore/aft direction when viewed from an operator who sits at an operator's seat in operator's cab 3. A lateral direction or a side direction means a direction of a vehicle width of motor grader 1. Namely, the lateral direction, the direction of the vehicle width, or the side direction means the lateral direction when viewed from the operator who sits at the operator's seat in operator's cab 3. In the drawings below, the fore/aft direction is shown with an arrow X, the lateral direction is shown with an arrow Y, and an up/down direction is shown with an arrow Z.

Vehicular body frame 2 includes a rear frame 21, a front frame 22, and an exterior cover 25. Rear frame 21 supports exterior cover 25 and components such as the engine arranged in engine compartment 6. Exterior cover 25 covers engine compartment 6. Exterior cover 25 is provided with an upper opening 26 and a lateral opening 27. Upper opening 26 and lateral opening 27 are provided to pass through exterior cover 25 in a direction of thickness.

For example, each of four rear wheels 12 is attached to rear frame 21 as being rotatably driven by driving force from the engine. Front frame 22 is attached in front of rear frame 21. For example, two front wheels 11 are rotatably attached to a front end portion of front frame 22.

Operator's cab 3 is carried on rear frame 21. In operator's cab 3, an operation portion (not shown) such as a steering wheel, a gear shift lever, a lever for controlling work implement 4, a brake, an accelerator pedal, and an inching pedal is provided. Operator's cab 3 may be carried on rear frame 21.

Work implement 4 mainly includes a draw bar 40, a circle 41, blade 42, a hydraulic motor 49, and various cylinders 44 to 48.

Draw bar 40 has a front end portion swingably attached to the front end portion of front frame 22. Draw bar 40 has a rear end portion supported on front frame 22 by a pair of lift cylinders 44 and 45. As a result of synchronous extending and retracting of the pair of lift cylinders 44 and 45, the rear end portion of draw bar 40 can move up and down with respect to front frame 22. Draw bar 40 is vertically swingable with an axis along a direction of travel of the vehicle being defined as the center, as a result of extending and retracting of lift cylinders 44 and 45 different from each other.

A draw bar shift cylinder 46 is attached to front frame 22 and a side end portion of draw bar 40. As a result of extending and retracting of draw bar shift cylinder 46, draw bar 40 is movable laterally with respect to front frame 22.

Circle 41 is rotatably attached to the rear end portion of draw bar 40. Circle 41 can be driven by hydraulic motor 49 as being rotatable clockwise or counterclockwise with respect to draw bar 40 when viewed from above the vehicle.

Blade 42 is supported as being slidable in the lateral direction with respect to circle 41 and as being vertically swingable with an axis in parallel to the lateral direction being defined as the center. Specifically, a blade shift cylinder 47 is attached to circle 41 and blade 42 and arranged along a longitudinal direction of blade 42. With blade shift cylinder 47, blade 42 is movable in the lateral direction with respect to circle 41.

A tilt cylinder 48 is attached to circle 41 and blade 42. As a result of extending and retracting of tilt cylinder 48, blade 42 swings around the axis in parallel to the lateral direction with respect to circle 41, and can change its orientation in the up/down direction. Tilt cylinder 48 can thus change an angle of inclination with respect to the direction of travel of blade 42.

As set forth above, blade 42 is constructed to be able to move up and down with respect to the vehicle, change an inclination with respect to the direction of travel, change an inclination with respect to the lateral direction, rotate, and shift in the lateral direction, with draw bar 40 and circle 41 being interposed.

<a1. Construction of Mechanism for Driving Front Wheels>

Figure 3:
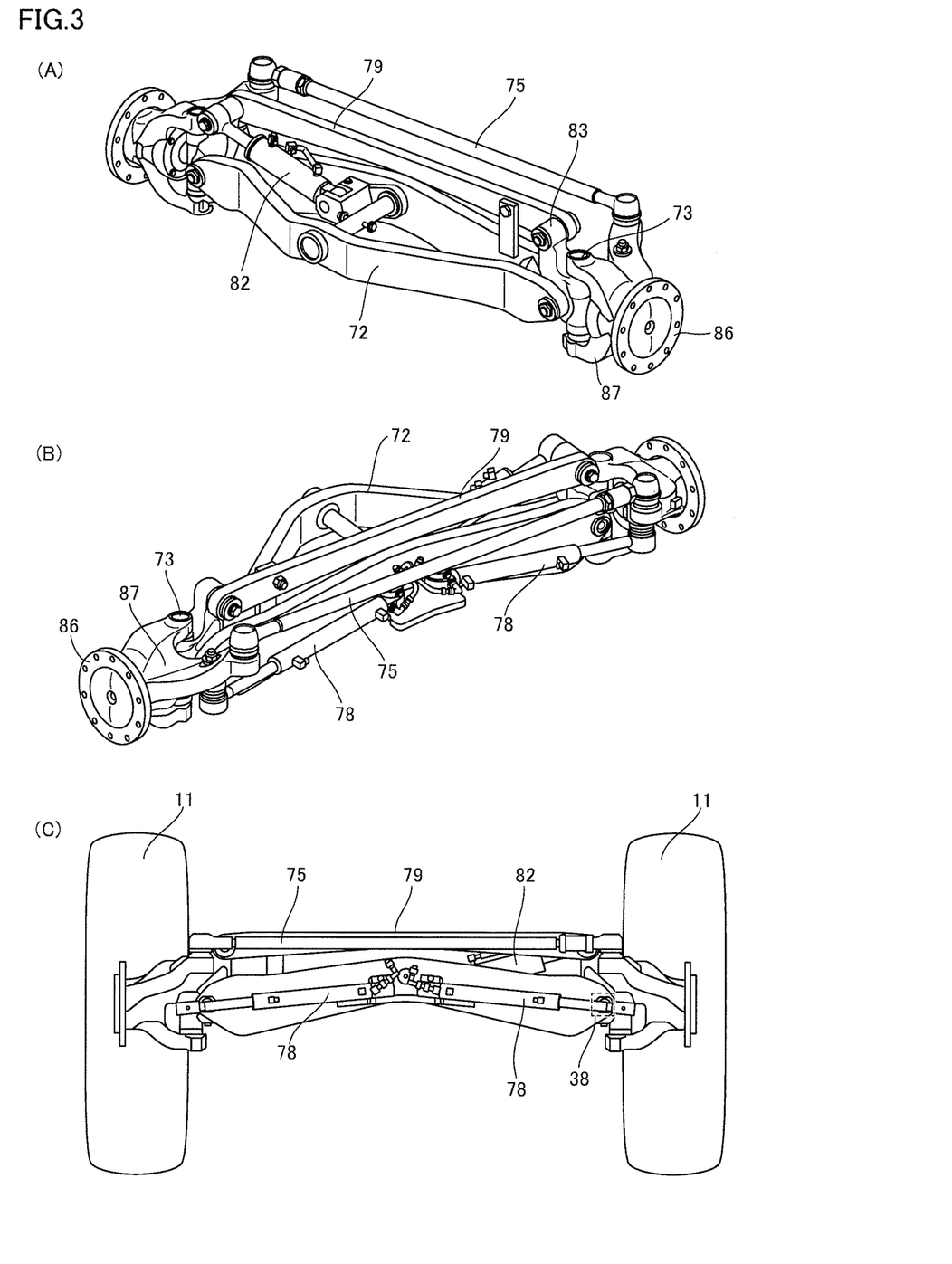
FIG. 3 is a diagram illustrating a mechanism for driving front wheels based on the embodiment.

FIG. 3 is a diagram illustrating a mechanism for driving the front wheels based on the embodiment.

FIG. 3 (A) is a diagram illustrating a front side of the mechanism for driving the front wheels.

A pair of tire hubs 86, a pair of knuckle brackets 87 coupled to the pair of tire hubs 86, a kingpin bracket 83 coupled to knuckle bracket 87 with kingpin 73 being interposed, and a front axle beam 72 between kingpin brackets 83 on opposing sides are provided as the mechanism for driving the front wheels. A leaning cylinder 82 is provided on an inner side of front axle beam 72. Leaning cylinder 82 is provided to incline front wheels 11 in the lateral direction with respect to front axle beam 72. Left and right kingpin brackets 83 are coupled to a leaning rod 79.

Kingpin bracket 83 and a rod of leaning cylinder 82 are coupled to each other. As the rod of leaning cylinder 82 extends and retracts, front wheel 11 is inclined with respect to front axle beam 72 with one kingpin bracket 83 being interposed. Movement of one kingpin bracket 83 is transmitted to the other kingpin bracket 83 through leaning rod 79, so that front wheel 11 on the other side is also simultaneously inclined with respect to front axle beam 72.

Leaning mechanism 30 is constituted of kingpin bracket 83, front axle beam 72, leaning cylinder 82, and leaning rod 79. In the present example, an angle of wheels with respect to front axle beam 72 being at 90 degrees is defined as an erect position.

Leaning cylinder 82 is extended and retracted by operating a leaning control lever provided in the operator's cab. A leaning operation is effective for further making a stewing radius at the time of revolution of motor grader 1 smaller. Since cutting works by motor grader 1 are done with blade 42 being angled, the front wheels of motor grader 1 receive skidding force. Therefore, the leaning operation is used also for maintaining straightness in travel with the front wheels being tilted during cutting works.

FIG. 3 (B) is a diagram illustrating a rear side of the mechanism for driving the front wheels.

A steering mechanism is shown.

The steering mechanism is constituted of knuckle bracket 87, kingpin 73, front axle beam 72, a steering cylinder 78, and a tie rod 75.

Knuckle bracket 87 is coupled to kingpin bracket 83 with kingpin 73 being interposed and revolves around kingpin 73. This revolving operation is performed in response to a steering operation in the operator's cab by a pair of steering cylinders 78 having opposing ends coupled between knuckle bracket 87 and front axle beam 72.

Knuckle brackets 87 of front wheels 11 on the right side and the left side are coupled to each other with tie rod 75.

FIG. 3 (C) is a diagram illustrating the rear side of the mechanism for driving the front wheels when front wheels 11 are also attached.

An angle sensor 38 is shown. Angle sensor 38 can detect an angle of inclination (a lean angle) of front wheel 11 with respect to front axle beam 72.

Figure 4:
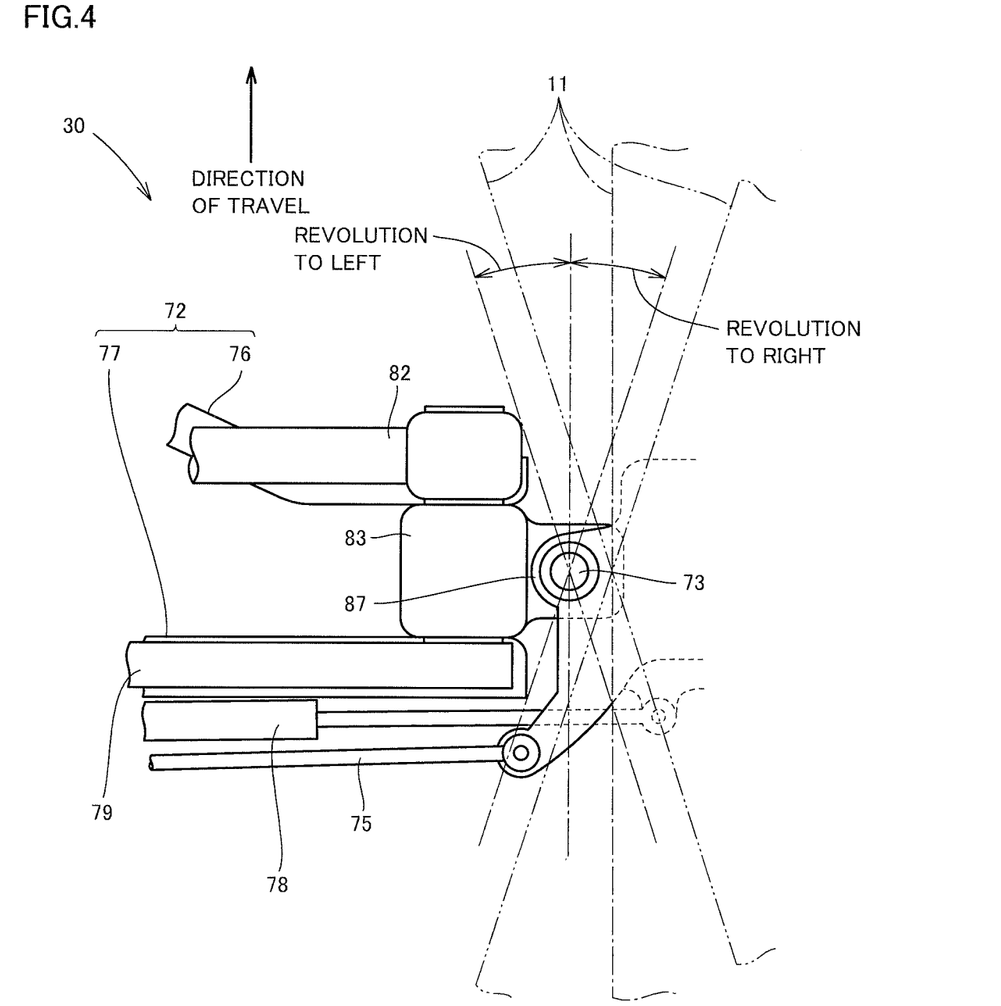
FIG. 4 is a diagram illustrating a portion when the mechanism for driving the front wheels based on the embodiment is viewed from above.

FIG. 4 is a diagram illustrating a portion when the mechanism for driving the front wheels based on the embodiment is viewed from above.

As shown in FIG. 4, front axle beam 72 includes a first cross member 76 supporting a lower front side of kingpin bracket 83 and a second cross member 77 supporting a lower rear side.

(The rod of) leaning cylinder 82 which inclines (leans) right front wheel 11 in the lateral direction is coupled to an upper front side of kingpin bracket 83. Leaning rod 79 which transmits the leaning operation to left front wheel 11 to simultaneously incline the front wheel is coupled to an upper rear side. This inclination operation is performed by extending and retracting leaning cylinder 82.

Knuckle brackets 87 on the left side and the right side are coupled to each other with tie rod 75. Therefore, when one steering cylinder 78 has right knuckle bracket 87 revolve, left knuckle bracket 87 which is not shown also revolves in coordination. Even in such a case, steering cylinder 78 can be provided also on the left side so that individual steering cylinders 78 have respective knuckle brackets 87 revolve. This is because, for example, when only one steering cylinder 78 on a side of right front wheel 11 performs a revolving operation, a feeling of strangeness in a steering operation may be caused in left revolution in which the rod moves forward and in right revolution in which the rod moves rearward due to a difference in speed between movement forward and rearward of the rod.

<a2. Construction of Mechanism for Leaning Front Wheels>

Figure 5:
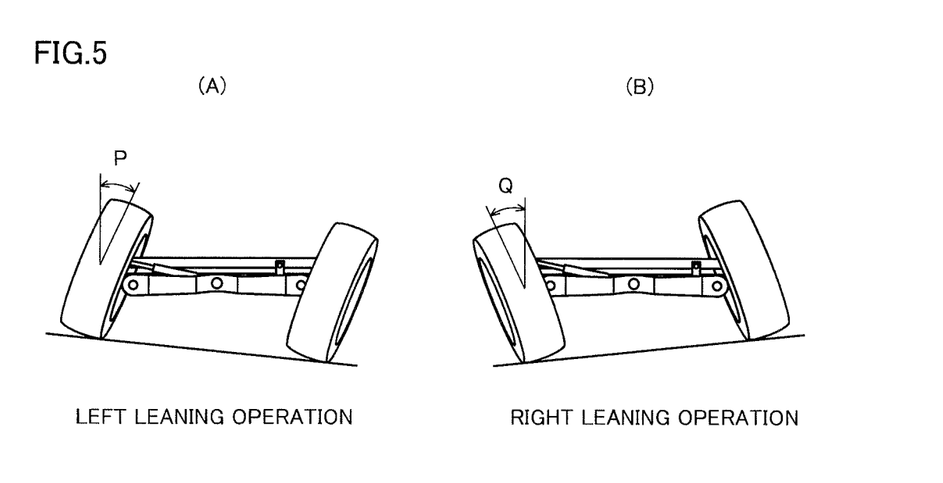
FIG. 5 is a conceptual diagram illustrating a leaning operation based on the embodiment.

FIG. 5 is a conceptual diagram illustrating a leaning operation based on the embodiment.

FIG. 5 (A) shows a state of front wheels 11 in a left leaning operation. Front wheels 11 are inclined to the left with extending and retracting of leaning cylinder 82. Accordingly, a stewing radius in left revolution is smaller.

FIG. 5 (B) shows a state of front wheels 11 in a right leaning operation. Front wheels 11 are inclined to the right with extending and retracting of leaning cylinder 82. Accordingly, a stewing radius in right revolution is smaller.

Angle sensor 38 detects angles of inclination P and Q with respect to front axle beam 72.

<a3. Construction of Operator's Cab>

Figure 6:
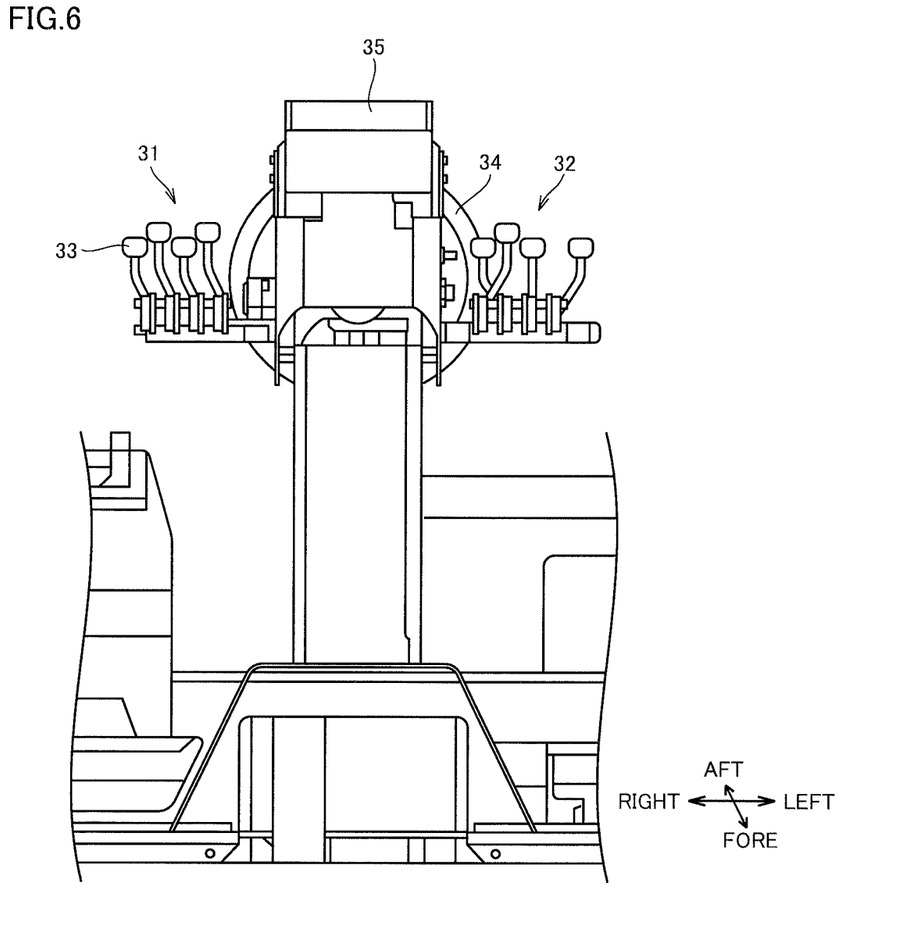
FIG. 6 is a front view showing an internal construction of an operator's cab 3 based on the embodiment.

FIG. 6 is a front view showing an internal construction of operator's cab 3 based on the embodiment.

As shown in FIG. 6, in operator's cab 3, a steering wheel post 35, a steering wheel 34, a left control lever group 32, and a right control lever group 31 are provided.

Steering wheel post 35 is arranged in front of an operator's seat. Steering wheel 34 is attached to steering wheel post 35 so as to face the operator's seat.

Left control lever group 32 includes a plurality of control levers such as a blade rotation lever and a shift cylinder control lever.

Right control lever group 31 includes a plurality of control levers such as an articulation control lever and a leaning control lever 33.

Each control lever included in left control lever group 32 and right control lever group 31 is fixed to steering wheel post 35. Right control lever group 31 and left control lever group 32 are provided as being pivotable in the fore/aft direction.

Leaning control lever 33 indicates a leaning operation to incline front wheel 11 from the erect position with respect to the ground.

By operating each control lever included in left control lever group 32 and right control lever group 31, a potentiometer is turned and an electric signal in accordance with a direction of operation thereof and in proportion to an operation stroke is output.

By way of example, when leaning control lever 33 is tilted forward, a leaning operation to incline front wheel 11 to the left with respect to front axle beam 72 is performed. When leaning control lever 33 is tilted rearward, a leaning operation to incline front wheel 11 to the right with respect to front axle beam 72 is performed.

Figure 7:
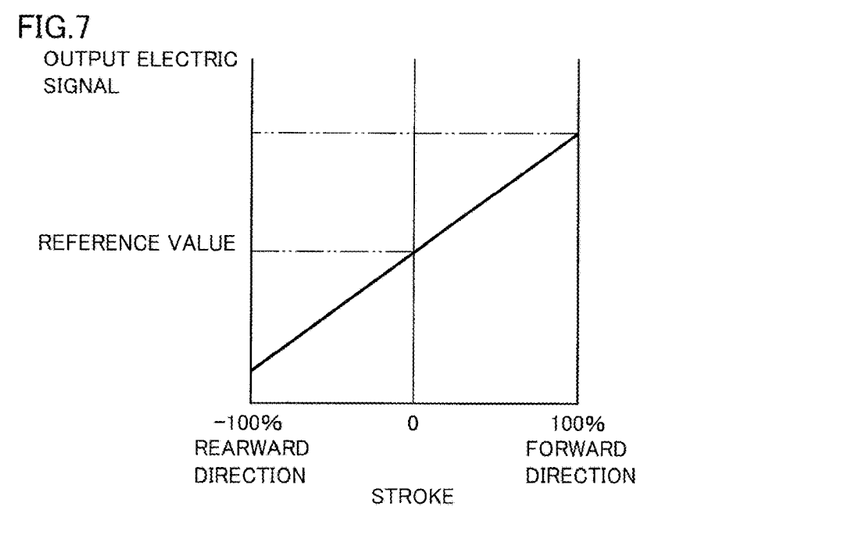
FIG. 7 is a diagram illustrating relation between an amount of stroke of a leaning control lever 33 and an output electric signal.

FIG. 7 is a diagram illustrating relation between an amount of stroke of leaning control lever 33 and an output electric signal.

As shown in FIG. 7, an operation to tilt leaning control lever 33 forward from a neutral position is expressed with a (+) sign and an operation to tilt the same rearward is expressed with a (−) sign. Leaning control lever 33 outputs an output electric signal in accordance with an amount of stroke. When an amount of stroke is 0, an output electric signal at a reference value is output.

When an amount of stroke indicated by leaning control lever 33 has the (+) sign, leaning cylinder 82 extends. Then, front wheel 11 is inclined to the right.

When an amount of stroke indicated by leaning control lever 33 has the (−) sign, leaning cylinder 82 retracts. Then, front wheel 11 is inclined to the left.

As the amount of stroke is greater (closer to 100% or −100%), a speed of extending or retracting of leaning cylinder 82 is higher.

<B. Configuration of Control System>

Figure 8:
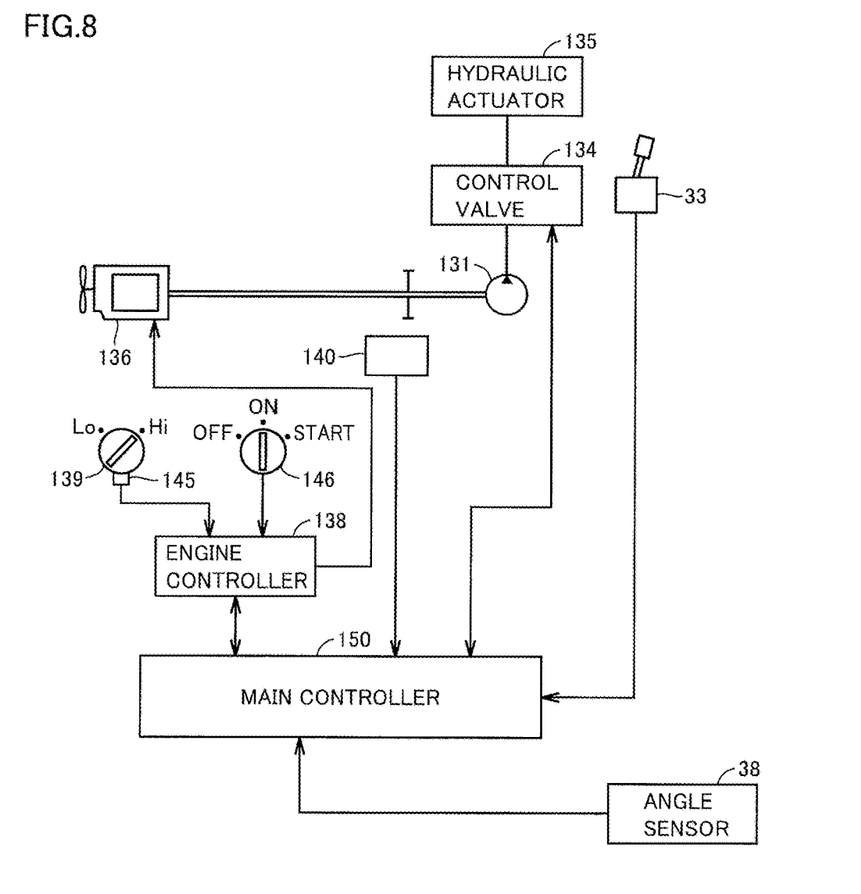
FIG. 8 is a block diagram showing a configuration of a control system included in motor grader 1 based on the embodiment.

FIG. 8 is a block diagram showing a configuration of a control system included in motor grader 1 based on the embodiment.

As shown in FIG. 8, the control system of motor grader 1 includes, by way of example, leaning control lever 33, a hydraulic pump 131, a control valve 134, a hydraulic actuator 135, an engine 136, an engine controller 138, a throttle dial 139, a rotation sensor 140, a multi-stage switch 145, a starter switch 146, a main controller 150, and angle sensor 38.

Hydraulic pump 131 delivers hydraulic oil used for driving work implement 4 and the like.

Hydraulic actuator 135 is connected to hydraulic pump 131 with control valve 134 being interposed. Hydraulic actuator 135 includes leaning cylinder 82.

Main controller 150 outputs a command in conformity with an output electric signal in accordance with a state of operation (an amount of operation and a direction of operation) of leaning control lever 33 to control valve 134.

Control valve 134 controls hydraulic actuator 135. Specifically, supply of hydraulic oil is switched in accordance with a command from main controller 150. For example, control valve 134 switches supply of hydraulic oil such that leaning cylinder 82 extends or retracts in accordance with the command from main controller 150.

Control valve 134 adjusts an amount of delivery of hydraulic oil to be supplied from hydraulic pump 131 to hydraulic actuator 135 in accordance with the command from main controller 150. When no command is given from main controller 150, control valve 134 stops supply of hydraulic oil from hydraulic pump 131.

Engine 136 has a driveshaft connected to hydraulic pump 131 and hydraulic pump 131 is driven in coordination with the driveshaft.

Engine controller 138 controls an operation of engine 136 in accordance with an instruction from main controller 150. Engine 136 is implemented by a diesel engine by way of example. The number of rotations of engine 136 is set through throttle dial 139 or the like, and an actual number of rotations of the engine is detected by rotation sensor 140. Rotation sensor 140 is connected to main controller 150.

Multi-stage switch 145 is provided in throttle dial 139. Multi-stage switch 145 detects a set value (a position resulting from an operation) of throttle dial 139. The set value of throttle dial 139 is transmitted to main controller 150. Multi-stage switch 145 outputs a command value for the number of rotations of engine 136 to engine controller 138. A target number of rotations of engine 136 is adjusted in accordance with the command value.

Engine controller 138 adjusts the number of rotations of engine 136 by controlling an amount of fuel injection by a fuel injection apparatus in accordance with an instruction from main controller 150. Engine controller 138 adjusts the number of rotations of engine 136 in accordance with a control instruction from main controller 150 to hydraulic pump 131.

Starter switch 146 is connected to engine controller 138. When an operator operates starter switch 146 (sets start), a start signal is output to engine controller 138 so that engine 136 starts.

Main controller 150 is a controller which controls the entire motor grader 1 and implemented by a central processing unit (CPU), a non-volatile memory, a timer, and the like.

Though a configuration in which main controller 150 and engine controller 138 are separate from each other is described in the present example, they can also be implemented as one common controller.

Angle sensor 38 detects an angle of inclination of front wheel 11 with respect to an axle beam and outputs a result of detection to main controller 150.

<C. Control Flow>

Figure 9:
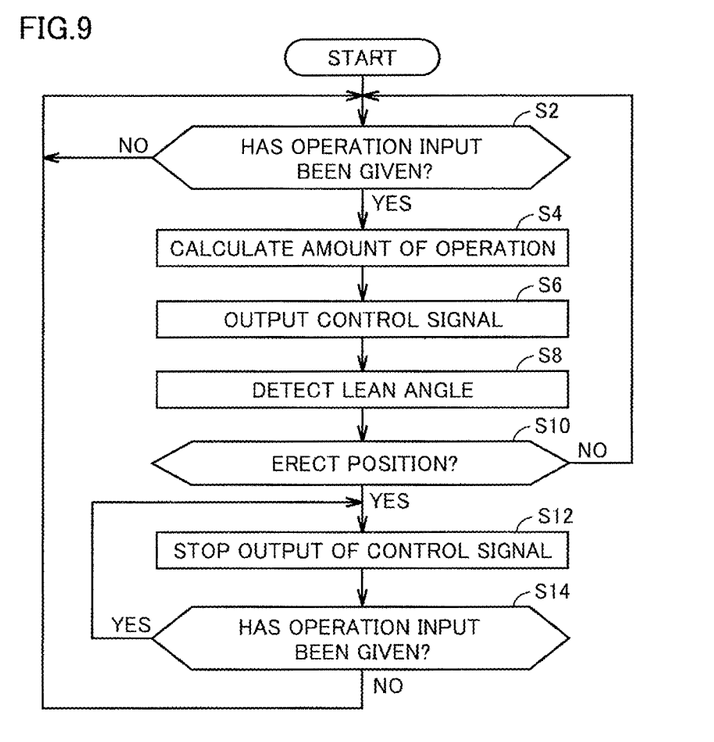
FIG. 9 is a flowchart illustrating processing for control of a pivot mechanism by a main controller 150 based on the embodiment.

FIG. 9 is a flowchart illustrating processing for control of a pivot mechanism by main controller 150 based on the embodiment.

As shown in FIG. 9, main controller 150 determines whether or not an operation input has been given (step S2). Main controller 150 determines whether or not an input of an output electric signal at a value other than a reference value has been given from leaning control lever 33.

When main controller 150 determines that an operation input has been given (YES in step S2), it calculates an amount of operation (step S4). When main controller 150 determines that an input of the output electric signal at a value other than the reference value has been given from leaning control lever 33, it calculates an amount of operation (amount of stroke) based on the value.

Main controller 150 outputs a control signal based on the calculated amount of operation (amount of stroke) (step S6). Specifically, when main controller 150 determines that the calculated amount of operation (amount of stroke) is +100%, it outputs a control signal for adjusting supply of hydraulic oil to control valve 134 such that leaning cylinder 82 extends at a highest speed. Then, front wheel 11 is inclined to the right. When main controller 150 determines that the calculated amount of operation (amount of stroke) is −100%, it outputs a control signal for adjusting supply of hydraulic oil to control valve 134 such that leaning cylinder 82 retracts at a highest speed. Then, front wheel 11 is inclined to the left. A speed of extending or retracting of leaning cylinder 82 is adjusted as a result of adjustment of an amount of supply of hydraulic oil in accordance with the calculated amount of operation (amount of stroke). Thus, a speed of inclination of front wheel 11 is adjusted.

Then, main controller 150 detects an angle of inclination (step S8). Main controller 150 detects an angle of inclination output from angle sensor 38.

Main controller 150 determines whether or not front wheel 11 is at the erect position based on the detected angle of inclination (step S10). Main controller 150 determines whether or not a detected angle of inclination is 0°, and when the angle of inclination is 0°, the main controller determines that front wheel 11 is at the erect position.

When front wheel 11 is at the erect position based on the calculated angle of inclination (YES in step S10), main controller 150 stops output of the control signal while an operation input from leaning control lever 33 is being given (step S12). When main controller 150 determines that front wheel 11 is at the erect position, it stops output of the control signal to control valve 134. Then, supply of hydraulic oil from hydraulic pump 131 to leaning cylinder 82 is stopped. Therefore, front wheel 11 maintains the erect position.

Main controller 150 determines whether or not an operation input has been given (step S14). Main controller 150 determines whether or not an input of an output electric signal at a value other than the reference value has been given from leaning control lever 33.

When main controller 150 determines in step S14 that an operation input has been given (YES in step S14), the process returns to step S12 and a state that output of the control signal has been stopped is maintained. Specifically, when main controller 150 determines that an input of an output electric signal at a value other than the reference value has been given from leaning control lever 33, it maintains a state that output of the control signal has been stopped.

When main controller 150 determines in step S14 that an operation input has not been given (NO in step S14), the process returns to step S2 and the process above is repeated. Specifically, when main controller 150 determines that an input of an output electric signal having the reference value has been given from leaning control lever 33, it determines that no operation input has been given and the process returns to step S2.

When main controller 150 determines in step S2 that an operation input has been given again, it calculates an amount of operation as described above and outputs a control signal to control valve 134 based on the calculated amount of operation. Then, a leaning operation in accordance with an operation of leaning control lever 33 is again performed.

In the scheme according to the present invention, when main controller 150 determines that front wheel 11 is at the erect position, it stops output of a control signal to control valve 134 even though an operation input from leaning control lever 33 continues. Then, when front wheel 11 is set to the erect position, the erect position is maintained even though an operation input from leaning control lever 33 continues.

When an operator performs an operation to set front wheel 11 to the erect position, the operator can automatically adjust the front wheel to the erect position by keeping tilting leaning control lever 33 in a direction in which front wheel 11 is set to the erect position. Therefore, motor grader 1 based on the present embodiment can make adjustment to a prescribed angle at which front wheel 11 is at the erect position in a normal manner of operations. Therefore, it is not necessary to perform complicated operations in a manner of operations different from a normal operation, and adjustment to a prescribed angle at which front wheel 11 is at the erect position can be made with a simplified scheme.

For example, by keeping tilting leaning control lever 33 rearward while front wheel 11 is inclined to the left from the erect position, front wheel 11 can readily be adjusted to the erect position.

According to the configuration, forced transition to a prescribed mode is not made. Therefore, adjustment to any angle of inclination can always be made by operating leaning control lever 33, and an operation high in degree of freedom can be performed.

When an operation to set front wheel 11 to the erect position is performed, leaning control lever 33 is kept tilted in a direction in which front wheel 11 is set to the erect position. In this case, a speed of pivot in automatic adjustment to the erect position can also be adjusted in accordance with an amount of operation (amount of stroke) for tilting, and an operation high in degree of freedom can be performed.

Such a leaning operation as below can be performed. When front wheel 11 is set to the erect position, tilting of leaning control lever 33 is stopped and return to the erect position is detected. Thereafter, front wheel 11 is inclined from the erect position by tilting leaning control lever 33 again.

Therefore, a leaning operation after automatic adjustment to the erect position can also readily be performed.

For example, while front wheel 11 is inclined to the left from the erect position, leaning control lever 33 is kept tilted rearward to adjust the front wheel to the erect position. Thereafter, leaning control lever 33 is returned to the neutral position. By tilting the leaning control lever rearward again (a direction the same as in the initial operation), a leaning operation to incline front wheel 11 from the erect position to the right can be performed.

By titling leaning control lever 33 forward (a direction reverse to the direction in the initial operation), a leaning operation to incline front wheel 11 from the erect position to the left can be performed.

Since front wheel 11 can be adjusted to the erect position with the use of leaning control lever 33 for performing a leaning operation in the configuration above, it is not necessary to provide a special switch and adjustment can be made with a simplified scheme.

Though a configuration for detecting an angle of inclination with angle sensor 38 is described above, an erect-state sensing sensor which determines whether or not front wheel 11 is located at the erect position may be provided instead of angle sensor 38. For example, a proximity sensor which is turned on when the front wheel is at the erect position and turned off otherwise can be provided.

Though leaning control lever 33 for performing a leaning operation is described above, an operation member is not limited to a control lever, and an operation switch which outputs an operation command in accordance with an amount of operation can also be provided.

Though an operation to lean the front wheel is mainly described in the present example, limitation to the front wheel is not intended and the leaning operation is also similarly applicable to rear wheels and to running wheels including the front wheels and the rear wheels.

FUNCTION AND EFFECT

A control method in a motor grader according to one aspect of the present invention, the motor grader including a running wheel, an inclination mechanism which inclines the running wheel, an operation portion, and a sensor capable of detecting whether or not the running wheel is at an erect position, includes outputting from a controller, a control signal for driving the inclination mechanism in response to an operation command in accordance with a state of operation onto the operation portion and stopping output of the control signal in response to the operation command when the sensor detects the erect position.

According to the present invention, a control signal for driving the inclination mechanism is output from the controller in response to an operation command in accordance with a state of operation onto the operation portion. When the running wheel is at the erect position, output of the control signal in response to the operation command in accordance with a state of operation from the controller is stopped. Therefore, it is not necessary to perform complicated operations, and adjustment to a prescribed angle at which the running wheel is at the erect position can be made with a simplified scheme.

Preferably, accepting stop of the operation command when the sensor detects the erect position and outputting again the control signal in response to the operation command after the stop of the operation command is accepted are further included.

According to the above, after adjustment to the erect position, a leaning operation can readily be performed such that an arbitrary angle is set in accordance with an operation command.

A motor grader according to one aspect of the present invention includes a running wheel, an inclination mechanism which inclines the running wheel, an operation portion, a sensor capable of detecting whether or not the running wheel is at an erect position, and a controller which controls the inclination mechanism. The controller outputs a control signal for driving the inclination mechanism in response to an operation command in accordance with a state of operation onto the operation portion and stops output of the control signal in response to the operation command when the sensor detects the erect position.

According to the present invention, a control signal for driving the inclination mechanism is output from the controller in response to an operation command in accordance with a state of operation onto the operation portion. When the running wheel is at the erect position, output of the control signal in response to the operation command in accordance with a state of operation from the controller is stopped. Therefore, it is not necessary to perform complicated operations, and adjustment to a prescribed angle at which the running wheel is at the erect position can be made with a simplified scheme.

Preferably, the controller accepts stop of the operation command when the sensor detects the erect position and outputs again the control signal in response to the operation command after the stop of the operation command is accepted.

According to the above, after adjustment to the erect position, a leaning operation can readily be performed such that an arbitrary angle is set in accordance with an operation command.

The embodiment disclosed herein is illustrative and not restricted to the above disclosure alone. The scope of the present invention is defined by the terms of the claims and is intended to include any modifications within the scope and meaning equivalent to the terms of the claims.

REFERENCE SIGNS LIST

1 motor grader; 2 vehicular body frame; 3 operator's cab; 4 work implement; 6 engine compartment; 11, 12 running wheel; 21 rear frame; 22 front frame; 25 exterior cover; 26 upper opening; 27 lateral opening; 30 leaning mechanism (inclination mechanism); 31 seat; 32 left control lever; 33 right control lever; 34 steering wheel; 35 support member; 38 angle sensor; 40 draw bar; 41 circle; 42 blade; 44, 45 lift cylinder; 46 draw bar shift cylinder; 47 blade shift cylinder; 48 tilt cylinder; 49 hydraulic motor; 72 front axle beam; 73 kingpin; 78 steering cylinder; 75 tie rod; 76 first cross member; 77 second cross member; 79 leaning rod; 82 leaning cylinder; 83 kingpin bracket; 86 tire hub; 87 knuckle bracket; 131 hydraulic pump; 134 control valve; 135 hydraulic actuator; 136 engine; 138 engine controller; 139 throttle dial; 140 rotation sensor; 145 multi-stage switch; 146 starter switch; and 150 main controller

The invention claimed is:

1. A control method in a motor grader, the motor grader including a running wheel, an inclination mechanism which inclines the running wheel, an operation portion, and a sensor capable of detecting whether the running wheel is at an erect position, the control method comprising:
outputting from a controller, a control signal for driving the inclination mechanism in response to an operation command in accordance with a state of operation onto the operation portion; and
stopping output of the control signal in response to the operation command when the sensor detects the erect position, wherein the output of the control signal stops while the state of operation onto the operation portion continues.

2. The control method in a motor grader according to claim 1, the control method comprising:
accepting stop of the operation command when the sensor detects the erect position; and
outputting again the control signal in response to the operation command after the stop of the operation command is accepted.

3. A motor grader comprising:
a running wheel;
an inclination mechanism which inclines the running wheel;
an operation portion;
a sensor capable of detecting whether the running wheel is at an erect position; and
a controller which controls the inclination mechanism,
the controller outputting a control signal for driving the inclination mechanism in response to an operation command in accordance with a state of operation onto the operation portion; and
stopping output of the control signal in response to the operation command when the sensor detects the erect position, wherein the controller stops the output of the control signal while the state of operation onto the operation portion continues.

4. The motor grader according to claim 3, wherein the controller accepts stop of the operation command when the sensor detects the erect position and outputs again the control signal in response to the operation command after the stop of the operation command is accepted.

5. The control method in a motor grader according to claim 1, wherein the control signal is a control signal proportional to the operation command in accordance with the state of operation onto the operation portion.

6. The control method in a motor grader according to claim 1, wherein the state of operation onto the operation portion is an operation amount and an operation direction of the operation portion.

7. The control method in a motor grader according to claim 1, wherein the operation portion is a lever.

8. The motor grader according to claim 3, wherein the control signal is a control signal proportional to the operation command in accordance with the state of operation onto the operation portion.

9. The motor grader according to claim 3, wherein the state of operation onto the operation portion is an operation amount and an operation direction of the operation portion.

10. The motor grader according to claim 3, wherein the operation portion is a lever.

* * * * *